United States Patent [19]

McFarlane et al.

[11] Patent Number: 5,052,495
[45] Date of Patent: Oct. 1, 1991

[54] IMPLEMENT HITCH

[75] Inventors: Stanley E. McFarlane; James E. McFarlane, both of Sauk City, Wis.

[73] Assignee: McFarlane Manufacturing Co., Inc., Sauk City, Wis.

[21] Appl. No.: 610,008

[22] Filed: Nov. 7, 1990

[51] Int. Cl.$^5$ .................. A01B 59/00; A01B 73/00
[52] U.S. Cl. .................. 172/140; 172/175; 172/443; 172/417
[58] Field of Search .............. 172/140, 175, 178, 181, 172/200, 310, 311, 417, 624.5

[56] References Cited

U.S. PATENT DOCUMENTS

| | | | |
|---|---|---|---|
| 2,785,614 | 3/1957 | Jensen | 172/443 |
| 2,786,589 | 3/1957 | Garrett | 172/443 X |
| 3,029,880 | 4/1962 | Heberlein | |
| 3,193,306 | 7/1965 | Pettit | |
| 3,559,746 | 2/1971 | Couser | 172/386 |
| 3,937,460 | 2/1976 | VanDerLely | 172/59 |
| 3,983,943 | 10/1976 | VanDerLely | 172/70 |
| 4,033,417 | 7/1977 | Rau et al. | 172/613 |
| 4,127,178 | 11/1978 | Blair | 172/198 |
| 4,136,741 | 1/1979 | Rambach | 172/443 X |
| 4,257,487 | 3/1981 | Brown | 172/140 |
| 4,479,549 | 10/1984 | Fegley | 172/142 |
| 4,487,268 | 12/1984 | Greve | 172/316 |
| 4,489,789 | 12/1984 | Pearce | 172/443 |
| 4,595,064 | 6/1986 | Anderson | 172/178 |
| 4,625,809 | 12/1986 | Moynihan | 172/178 |
| 4,650,006 | 3/1987 | Reimann | 172/443 |
| 4,703,810 | 11/1987 | Meiners | 172/178 |
| 4,715,449 | 12/1987 | Winter et al. | 172/624.5 X |
| 4,729,435 | 3/1988 | Urich | 172/624.5 X |
| 4,762,182 | 8/1988 | Reimann | 172/327 |

OTHER PUBLICATIONS

HDL Spike Tooth Harrows & Carts, McFarlane Mfg. Co. Inc., Sauk City, Wis.
Mounted Harrows, McFarlane Mfg. Co. Inc., Sauk City, Wis.

Primary Examiner—David H. Corbin
Assistant Examiner—Jeffrey L. Thompson
Attorney, Agent, or Firm—Lathrop & Clark

[57] ABSTRACT

A hitch for connecting a first implement to a second implement pulled behind a tractor is disclosed which has a first parallel linkage assembly with two upright members with upper and lower portions, the upper portions of the upright members being connected by an upper follower arm and the lower portions of the upright members being pivotally connected by a lower follower arm. One upright member is adapted to rigidly connect to the second implement. A central horizontal member has two opposed ends and front and rear sides. An upright member of the first parallel linkage is rigidly connected to the front side of the horizontal member. Ground engaging caster wheels are pivotally mounted on each end of the horizontal member. A second parallel linkage has two upright members with upper and lower portions. The upper portions of the upright members are pivotally connected by an upper lifting arm and the lower portions of the upright members are pivotally connected by a lower lifting arm. One upright member is rigidly connected to the rear side of the horizontal member and the other upright member is adapted to connect to the first implement. An actuator is mounted between the central member and the second parallel linkage and adapted to move a connected first implement between a first lowered, ground-engaging position and an elevated position, wherein the weight of the first implement is substantially carried by the caster wheel. The hitch may be employed for connecting a harrow or drag behind a tractor-pulled disc tiller.

10 Claims, 4 Drawing Sheets

1

IMPLEMENT HITCH

FIELD OF THE INVENTION

The present invention relates generally to hitches for connecting farm implements to tractors.

BACKGROUND OF THE INVENTION

In preparing a field for planting, disc tillers are commonly used to break up the soil of a plowed field and a ground-engaging implement such as a spike-tooth harrow is used to smooth and further reduce the soil cut by the disc blades. These two operations may be performed by separate passes over the field, the first with a tractor pulling a disc, the second with a tractor pulling a harrow. To avoid the need for making separate passes, harrows have been connected behind the disc tiller in a number of ways. Harrows have been mounted directly to the disc tillers, but because the weight of the harrow must be supported by the disc the weight and size of the harrow must be kept low to avoid uneven loads on the front and rear disc gangs of the disc tiller. Furthermore, some conventional discs are not sufficiently sturdy to carry the extra load of an attached harrow.

To take the load of the harrow off the disc, a separate trailer hitch with its own wheels and a single pivotable hitch point may be used for pulling the harrow behind the disc. However, to avoid interference with the harrow and the disc when executing turns, it is necessary to have a long pull bar on the harrow trailer which makes transport and manuevering of the combined implements cumbersome. When transporting the implements over roads or fields to be left uncultivated it is necessary to raise the discs and the harrow teeth above the ground.

What is needed is a hitch for mounting a harrow closely behind a disc cultivator which will not transmit significant loads to the disc itself yet which will permit easy manuevering of the implement assembly and transport of the harrow over roads.

SUMMARY OF THE INVENTION

The hitch for connecting a first implement to a second implement pulled behind a tractor of this invention has a first parallel linkage assembly with two upright members with upper and lower portions, the upper portions of the upright members being connected by an upper follower arm and the lower portions of the upright members being pivotally connected by a lower follower arm. One upright member is adapted to rigidly connect to the second implement. A central horizontal member has two opposed ends and front and rear sides. An upright member of the first parallel linkage is rigidly connected to the front side of the horizontal member. Ground engaging caster wheels are pivotally mounted on each end of the horizontal member. A second parallel linkage has two upright members with upper and lower portions. The upper portions of the upright members are pivotally connected by an upper lift arm and the lower Portions of the upright members are pivotally connected by a lower lift arm. One upright member is rigidly connected to the rear side of the horizontal member and the other upright member is adapted to connect to the first implement. An actuator is mounted between the central member and the second parallel linkage and adapted to move a connected first implement between a first lowered, ground-engaging position and an elevated position, wherein the weight of the first implement is substantially carried by the caster wheels.

It is an object of the present invention to provide a hitch for mounting a harrow in close proximity to a disc tiller.

It is a further object of the present invention to provide a hitch for mounting a harrow to a disc tiller which will not transmit significant loads to the disc.

It is another object of the present invention to provide a hitch for mounting a harrow to a disc which is compact and may raise the harrow for transportation over roads.

It is also an object of the present invention to provide a hitch for mounting a farm implement in line to a tractor towed implement which is vertically flexible.

Further objects, features and advantages of the invention will be apparent from the following detailed description when taken in conjunction with the accompanying drawings.

DESCRIPTION OF THE PREFERRED EMBODIMENT

Figure 1:
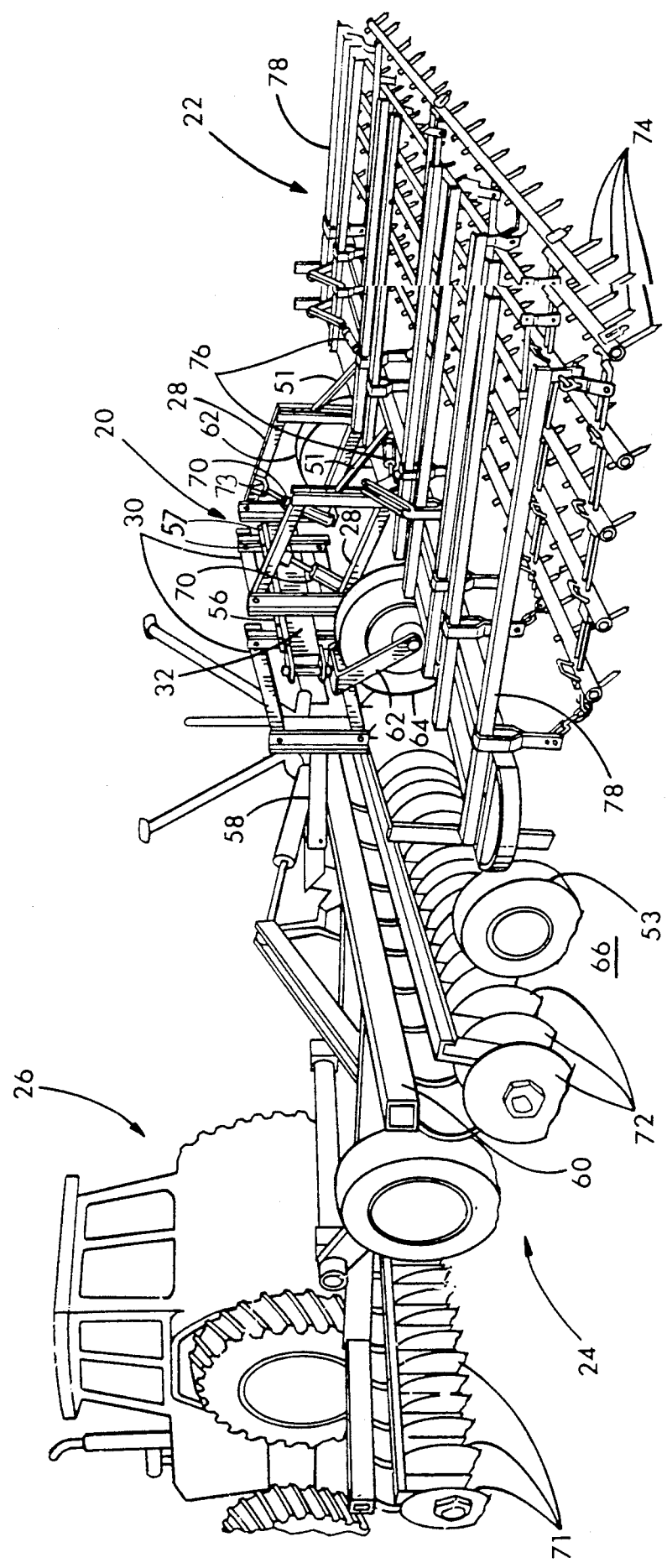
FIG. 1 is a Perspective view of the hitch of this invention connecting a harrow to a disc tiller pulled by a tractor.
Figure 2:
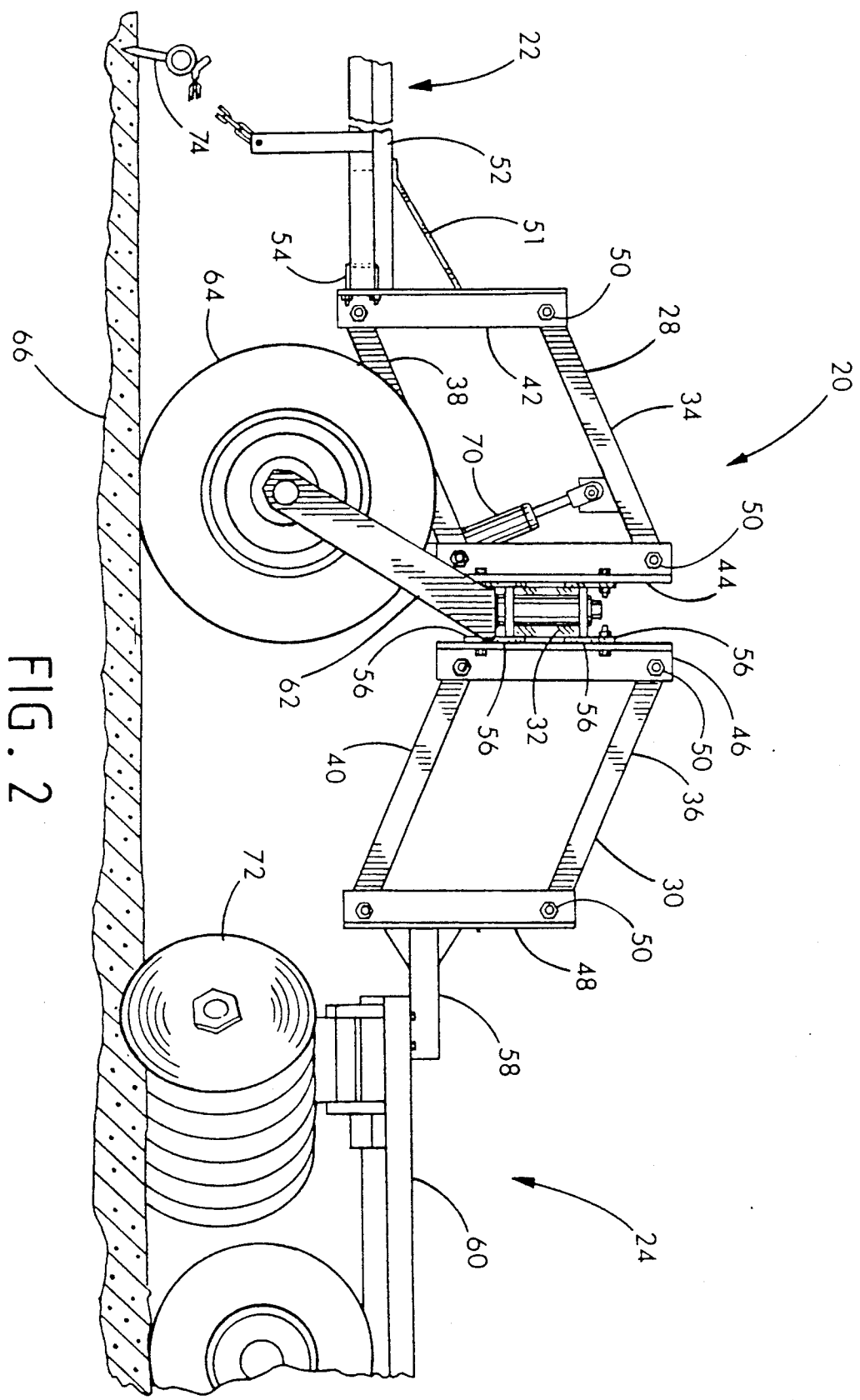
FIG. 2 is a side elevational view of the hitch of FIG. 1.
Figure 3:
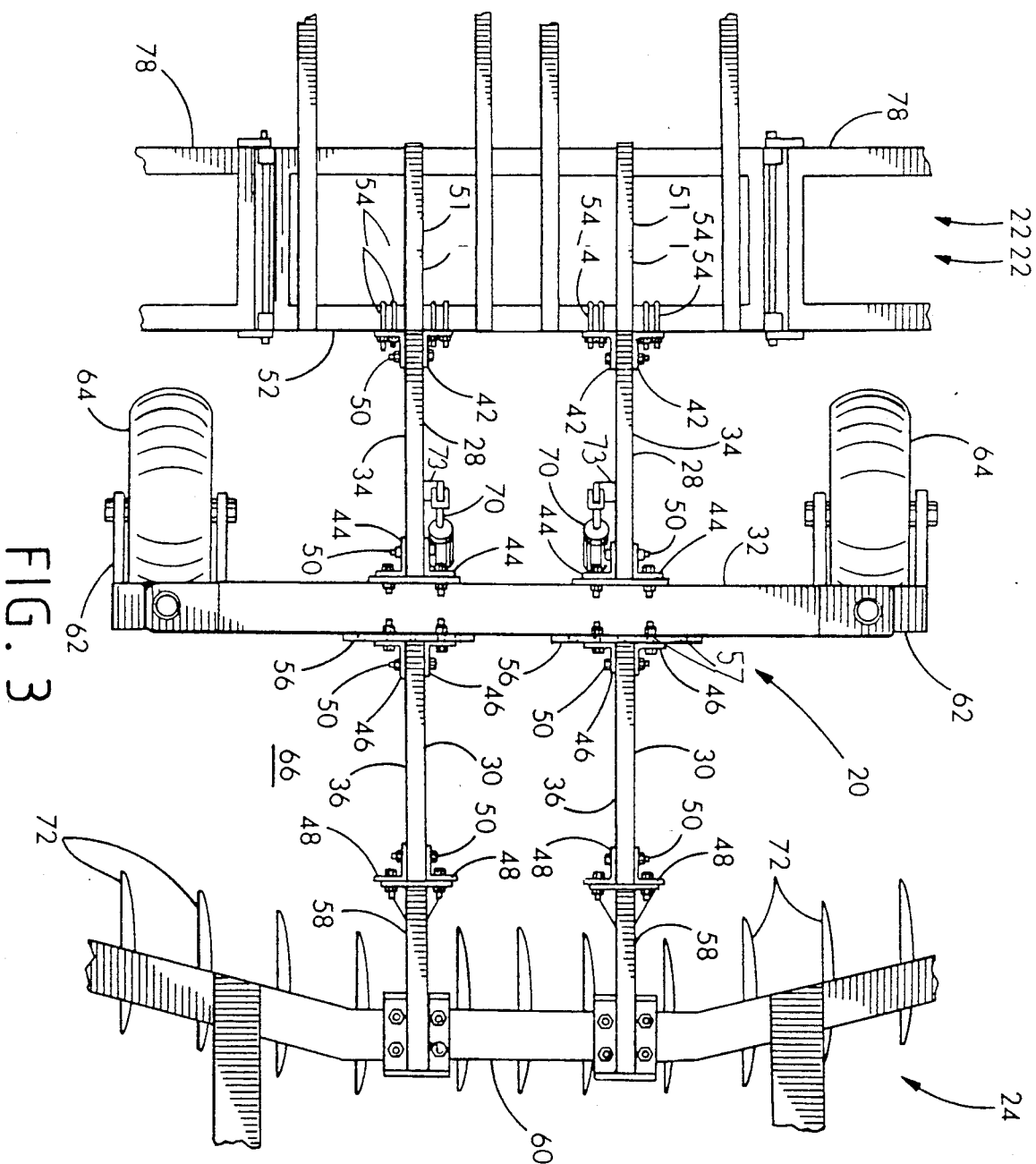
FIG. 3 is a top plan view of the hitch of FIG. 1.

Referring more particularly to FIGS. 1-4 wherein like numbers refer to similar parts, the hitch 20 of the present invention is shown in FIG. 1 connecting a harrow 22 to a disc tiller 24 which is in turn hitched in a conventional manner to a tractor 26. As best shown in FIGS. 2 and 3 the hitch 20 has two pairs of parallelogram linkages 28, 30 bolted to a central horizontal tubular member 32.

Each of the disc linkages 30 has a pair of upright brackets 48 which are connected to the disc 24 by horizontal mounting members 58. Upper and lower follower arms 36, 40 are pivotally connected at the top and the bottom of the upright disc bracket by bolts 50. The follower arms 36, 40 are pivotally connected between two upright brackets 46 which are attached to the central horizontal member 32 so as to retain the upright brackets 46, 48 in continual parallel relation. The pairs of upright brackets 46, 48 in each linkage 30 are sufficiently spaced from the follower arms 36, 40 that when the follower arms are bolted between the upright brackets the follower arms are free to pivot between the brackets.

The harrow parallel linkage 28 is preferably of proportions similar to the disc linkage 30. Each of the two harrow linkages 28 has a pair of upright brackets 44 mounted to the central horizontal member 32 and a pair of upright brackets 42 mounted to the harrow 22. The upright brackets 42 are connected to the frame 52 of the harrow 22 by U-shaped bolts 54 and by inclined braces 51 that run from mid-way points on the vertical brackets 42 to the frame 52. The upright brackets 42, 44 of each harrow linkage 28 are connected and maintained in parallel relationship by two lifting arms 34, 38 of equal length. The upper lifting arm 34 is pivotally connected at the tops of the upright brackets 42, 44 and the lower lifting arm 38 is pivotally connected at the bottoms of the upright brackets 42, 44.

The upright brackets 46 of the disc parallel linkages 30 are attached to the central member 32 by being bolted to positioning plates 56 which are welded to the central member 32. The positioning plates have a series of horizontally spaced holes 57 which permit the spacing between the linkages 30 to be adjusted to accommodate discs of varying proportions.

The central member 32 has caster wheel assemblies 62 pivotally mounted on either end with wheels 64 which remain continuously in contact with the ground 66. These pivotal connections allow the assemblies 62 to rotate about a vertical axis.

Figure 4:
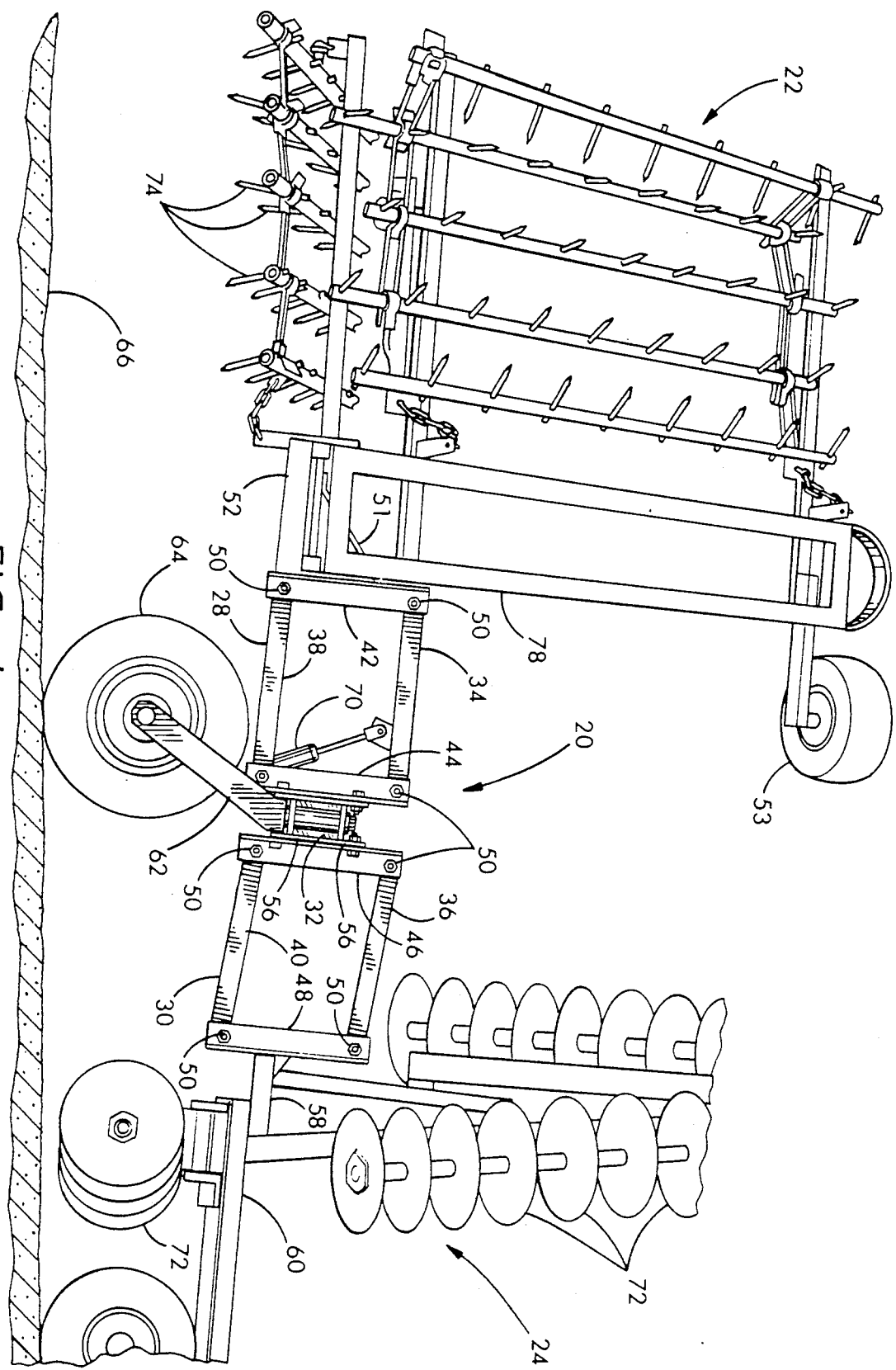
FIG. 4 is a side elevational view of the hitch of FIG. 1 with the harrow and disc folded upwards and the hitch in its raised transport configuration.

Actuators 70, which are preferably hydraulic cylinder-piston assemblies, are preferably mounted between the upright brackets 44 and brackets 72 located on the upper lifting arms 34 intermediate between the upright brackets 42, 44. The actuators may alternatively be connected directly to the central horizontal member 32 and may extend to either of the three remaining members of the harrow linkage 28. The actuators 70 serve to raise the harrow 22 from a first, lowered, ground-engaging position to a second, raised and transportable position, as shown in FIG. 4.

When the tractor 26, disc 24, harrow 22 and hitch 20 are in operation, the discs 71, 72 of the disc tiller 24 and the teeth 74 of the harrow 22 are in engagement with the ground 66. The wing wheels 53 bear a portion of the weight of the harrow, and space the harrow frame 52 from the ground 66 at the ends of the wings 78. For effective operation, the front discs 71 and the rear discs 72 should be digging the same depth into the ground 66. For this reason, it is important that the weight of the harrow is not carried by the hitch 20 onto the disc 24, as the additional weight would cause the rear discs 72 to dig more deeply into the ground than the front discs 71. The hitch 20 of this invention places minimal weight on the rear of the cultivator 24 due to the flexible connection in a vertical plane provided by the disc parallel linkages 30. Downward motion of the central member 32 and the attached harrow 22 will lower one set of upright brackets 46 and the ends of the upper and lower follower arms 36, 40, but because of the pivotal connections the upright brackets 48 rigidly connected to the disc will not be depressed or elevated.

In the operational position the actuators 70 are retracted and locked to hold the harrow parallel linkages 28 fixed in a lowered position suspending the frame 52 of the harrow 22 above the ground 68 for engagement of the teeth 74 with the ground. The gangs of harrow teeth 74 are connected by chains to the harrow frame 52 allowing the teeth to closely follow the ground elevation.

The wheels 64 of the caster wheel assemblies 62 follow the elevation of the ground 68 allowing the frame 52 to remain closely spaced from the ground and the teeth 74 suspended from the frame to engage the ground to a desired depth. Because of the pivotal connections of the disc parallel linkages 30 which connect the disc 24 to the central member 32 there is no tendency for the disc 24 to be raised up by the hitch 20 if a shallow in the ground 68 occurs between the caster wheel assemblies 62 and the tractor 26.

The four parallel linkages 28, 30 retain the harrow 22 rigidly in line with the disc cultivator 24. This alignment ensures that the teeth 74 of the harrow 22 will follow over the ground 68 which has been treated by the discs 71, 72 of the disc tiller 24. Furthermore, because the harrow 22 and disc 24 are connected as one unit, jackknifing of the two implements is avoided when it is necessary to back up the tractor 26.

It should be noted that the hitch 20 may be used whenever it is desired to support one implement behind another implement which is connected to a tractor without transmitting the load of the first implement to the tractor-connected implement. Although a spike tooth harrow is shown in the preferred embodiment, flexible chain harrows, spring tooth harrows or others may equally be used in connection with the hitch 20.

In order to transport the harrow 22 and disc 24, across a roadway or field, as shown in FIG. 4 the actuators 70 are activated to elevate the parallel linkages 28 and raise the harrow 22 and the harrow teeth 74 above the ground 68. Actuators 76 located on the harrow frame 52, as best shown in FIG. 1, are actuated to raise the two wings 78 of the harrow 22 into an upright position (shown in FIG. 4) for a transportable width acceptable for highway travel. In FIG. 4, for clarity, only one of the elevated wings 78 has been shown. The disc 71 of the cultivator are also raised from contact with the ground. In the elevated transport position, the hitch 20 transmits the weight of the harrow 22 onto the wheels 64 attached to the central member 32.

It is understood that the invention is not confined to the particular construction and arrangement of parts herein illustrated and described, but embraces such modified forms thereof as come within the scope of the following claims.

We claim:

1. A hitch for connecting a first implement to a second implement pulled behind a tractor comprising:
   (a) a first parallel linkage assembly having two upright members with upper and lower portions, the upper portions of the upright members being pivotally connected by an upper follower arm and the lower portions of the upright members being pivotally connected by a lower follower arm, one upright member being adapted to rigidly connect to the second implement;
   (b) a central horizontal member having two opposed ends and front and rear sides, wherein the other one of said upright members of the first parallel linkage is rigidly connected to the front side of the horizontal member;
   (c) ground engaging caster wheels pivotally mounted on each end of the horizontal member;
   (d) a second parallel linkage having two upright members with upper and lower portions, the upper portions of the upright members being pivotally connected by an upper lifting arm, and the lower portions of the upright members being pivotally connected by a lower lifting arm, one upright member being rigidly connected to the rear side of the central horizontal member and the other upright member being adapted to connect to the first implement; and
   (e) an actuator mounted between the central member and the second parallel linkage and adapted to move a connected first implement between a lowered, ground-engaging, position and an elevated position, wherein the weight of the first implement is substantially carried by the caster wheels.

2. The hitch of claim 1 wherein two first parallel linkage assemblies are connected to the front side of the horizontal member and adapted for attachment to the second implement and two second parallel linkages are connected to the rear side of the central horizontal member and adapted for attachment to the first implement.

3. The hitch of claim 2 further comprising positioning plates connected to the front of the central horizontal member and having a series of horizontally spaced bolt holes to permit the adjustable connection of the first parallel linkages to the central horizontal member to accommodate attachment to second implements of varying dimensions.

4. The hitch of claim 1 wherein the upright members comprise two spaced vertical brackets.

5. The hitch of claim 1 wherein the actuator is pivotally mounted to the upright member connected to the rear of the central horizontal member and pivotally mounted to the upper lifting arm of the second parallel linkage.

6. The hitch of claim 1 wherein the upright members comprise two spaced vertical brackets.

7. A harrow for connection to a disc, comprising:
   (a) A harrow frame;
   (b) A first parallel linkage assembly having two upright members with upper and lower portions, the upper portions of the upright members being pivotally connected by an upper follower arm and the lower portions of the upright members being pivotally connected by a lower follower arm such that the upright members are retained in parallel relationship, one upright member being adapted for rigid connection to the disc;
   (c) A central horizontal member having two opposed ends and front and rear sides, wherein the other one of said upright members of the first parallel linkage is rigidly connected to the front side of the horizontal member;
   (d) Ground engaging caster wheels pivotally mounted on each end of the horizontal member;
   (e) A second parallel linkage having two upright members with upper and lower portions, the upper portions of the upright members being pivotally connected by an upper lifting arm, and the lower portions of the upright members being pivotally connected by a lower lifting arm, such that the upright members are retained in parallel relationship, one upright member being rigidly connected to the rear side of the central horizontal member, and the other upright member being connected to the harrow frame; and
   (f) An actuator mounted between the central member and the second parallel linkage and adapted to move the harrow frame between a lowered, ground-engaging position and an elevated position, wherein the weight of the harrow is substantially carried by the caster wheels.

8. The harrow of claim 7 wherein the actuator is pivotally mounted to the upright member connected to the rear of the central horizontal member and pivotally mounted to the upPer lifting arm of the second parallel linkage.

9. The hitch of claim 7 wherein two first parallel linkage assemblies are connected to the front side of the horizontal member and adapted for attachment to the disc and two second parallel linkages are connected to the rear side of the central horizontal member and are attached to the harrow.

10. The hitch of claim 9 further comprising positioning plates connected to the front of the central horizontal member and having a series of horizontally spaced bolt holes to permit the adjustable connection of the first parallel linkages to the central horizontal member to accommodate attachment to discs of varying dimensions.

* * * * *